US007149964B1

(12) United States Patent
Cottrille et al.

(10) Patent No.: US 7,149,964 B1
(45) Date of Patent: Dec. 12, 2006

(54) CREATION AND DELIVERY OF CUSTOMIZED CONTENT

(75) Inventors: Scott C. Cottrille, Redmond, WA (US); Ade A. Olubummo, Bothell, WA (US); Antony Halim, Bellevue, WA (US); Brian R. Daugherty, Bellevue, WA (US); Patrick Pei Cai, Issaquah, WA (US); Craig Harry, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/500,655

(22) Filed: Feb. 9, 2000

(51) Int. Cl.
*G06F 17/00* (2006.01)
*G06F 17/24* (2006.01)
*G06F 17/20* (2006.01)
*G06F 15/16* (2006.01)

(52) U.S. Cl. .................. 715/513; 715/501.1; 715/523; 704/8; 709/203

(58) Field of Classification Search ............. 715/500.1, 715/501.1, 513, 514, 536, 523, 760; 709/203, 709/217, 218, 219, 223; 707/104.1, 3, 9, 707/102; 704/8
See application file for complete search history.

(56) References Cited

U.S. PATENT DOCUMENTS

| | | | | |
|---|---|---|---|---|
| 5,717,923 A * | 2/1998 | Dedrick | ...................... | 707/102 |
| 5,793,381 A * | 8/1998 | Edberg et al. | .............. | 345/467 |
| 5,870,084 A * | 2/1999 | Kanungo et al. | ........... | 345/551 |
| 6,023,714 A * | 2/2000 | Hill et al. | .................... | 715/513 |
| 6,092,035 A * | 7/2000 | Kurachi et al. | ................ | 704/3 |
| 6,122,658 A * | 9/2000 | Chaddha | ..................... | 709/203 |
| 6,138,086 A * | 10/2000 | Rose et al. | .................... | 704/8 |
| 6,166,666 A * | 12/2000 | Kadyk | ......................... | 341/87 |
| 6,167,441 A * | 12/2000 | Himmel | ..................... | 709/217 |
| 6,182,148 B1 * | 1/2001 | Tout | ........................... | 709/245 |
| 6,195,696 B1 * | 2/2001 | Baber et al. | ................ | 709/223 |
| 6,314,469 B1 * | 11/2001 | Tan et al. | ................... | 709/245 |
| 6,345,279 B1 * | 2/2002 | Li et al. | .................. | 707/104.1 |
| 6,345,293 B1 * | 2/2002 | Chaddha | ..................... | 709/219 |
| 6,356,894 B1 * | 3/2002 | Nosohara | ....................... | 707/3 |
| 6,418,439 B1 * | 7/2002 | Papierniak et al. | ........... | 707/9 |
| 6,434,747 B1 * | 8/2002 | Khoo et al. | ................... | 725/46 |
| 6,492,995 B1 * | 12/2002 | Atkin et al. | ................ | 715/703 |
| 6,557,005 B1 * | 4/2003 | Burget | ........................ | 707/102 |
| 6,623,529 B1 * | 9/2003 | Lakritz | ........................ | 715/536 |
| 6,647,425 B1 * | 11/2003 | Chaddha | ..................... | 709/233 |

OTHER PUBLICATIONS

Mohan et al., "Adapting Multimedia Internet Content for Universal Acess", IEEE Transactions on Multimedia, vol. 1, No. 1, pp. 104-114, Mar. 1999.*

Mohan et al., "Multimedia Content Customization for Universal Access", SPIE Conference on Multimedia Storage and Archiving Systems III, Boston, MA, pp. 410-418, Nov. 1998.*

(Continued)

*Primary Examiner*—William Bashore
*Assistant Examiner*—Maikhanh Nguyen
(74) *Attorney, Agent, or Firm*—Christensen O'Connor Johnson Kindness PLLC (57) ABSTRACT

A method, apparatus, and software are disclosed for delivering customized content to clients with diverse content needs, such as clients from diverse geographical areas and language backgrounds. Customizable content is separated from the underlying code, which is used as a template for inserting localized content into a basic document framework as represented by the template. Both electronic mail and web community customization techniques are disclosed.

21 Claims, 6 Drawing Sheets

OTHER PUBLICATIONS

Sakaguchi, Tetsuo et al., "A Browsing Tool for Multi-lingual Documents for Users without Multi-lingual Fonts", ACM International Conference on Digital Libraries, pp. 63-71, Mar. 1996.*

Starney et al., "Website Localization", Proceedings of the 17th annual international conference on Computer documentation, Oct. 1999, ACM, pp. 127-130.*

Burns et al., "Opentag and TMX: XML in the Localization Industry", Proceedings of the 16th annual international conference on Computer documentation, Sep. 1998, pp. 137-142.*

Caldwell, JT., "Unicode: A Standard International Character Code for Multilingual Information Processing", Characters and Computers, IOS Press, 1991, pp. 180-191.*

Pei-Chi Wu, "Transition from national standards to Unicode: Multilingual support in operation systems and programming languages", Software-Practice and Experience, Jan. 2000, pp. 765-774.*

Apple Computer, Inc., "Programming With The Text Encoding Conversion Manager", Technical Publication, Apr. 1999, pp. 1-286.*

O'Conner, "Java Internationalization: An Overview", Java Developer Connection-Java.sun.com, Jul. 1998.*

Kano, N., "Developing International Software for Windows 95 and Windows NT", *Microsoft Press*, (1995).

* cited by examiner

CREATION AND DELIVERY OF CUSTOMIZED CONTENT

COPYRIGHT NOTICE AND PERMISSION

A portion of the disclosure of this patent document may contain material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice shall apply to this document: Copyright © 2000, Microsoft, Inc.

TECHNICAL FIELD OF THE INVENTION

The present invention pertains generally to computer networking, and more particularly to the creation and delivery of content using the Internet.

BACKGROUND OF THE INVENTION

Electronic mail and the Internet have become increasingly common ways of delivering information to users throughout the world. Due to the international nature of the Internet, information providers have experienced a growing need to provide content that is interesting and understandable to diverse users from various parts of the world. For example, French users are likely to be more interested in information relating to France than in information relating to the United States. Also, they generally prefer information to be presented in French rather than English. The process of providing customized content that is both understandable and interesting to users from diverse locations is known as localization.

Conventionally, localization involves predicting locations from which users are likely to originate and creating electronic documents, such as electronic mail messages and HTML pages, for each such location. For example, a set of documents is typically created for each country for which localization is desired. Multilingual countries, such as Canada, might have two or more associated sets of documents.

Maintaining multilingual content presents a number of challenges. First, it is desirable to use server resources efficiently by supporting multiple languages from each server. This server should also readily support the addition of new languages. Another challenge is the need to preserve the operability of the code underlying the content, e.g., HTML formatting. Because localization is often performed by parties other than the content provider, localized versions of content may not be coordinated with each other. As a result, integrating several localized versions of content can suffer from compatibility problems or other impediments.

This challenge is further complicated by the variety of browsers and browser versions employed by various users around the world. Because browsers have individual nuances and differences in character set support (e.g., DBCS, UTF-8, Unicode), support for several different types of browsers is desirable.

With respect to electronic mail, most conventional web systems use a plain text electronic mail format that does not adequately provide rich-text features, such as user-selectable fonts and colors. Further, the fixed portion of electronic mail messages is typically embedded in the code, making localization to other languages and locations difficult.

SUMMARY OF THE INVENTION

According to various example implementations of the invention, there is provided a process for generating and delivering customized content to clients in both electronic mail and web contexts, including, but not limited to, web communities. In both of these contexts, customizable content is isolated from underlying code, which is used as a template that represents a basic document framework into which customized content is inserted. The content may be customized for clients of diverse language and geographical backgrounds in a process known as localization. Alternatively, the content may be customized for other purposes, such as promotion of specific brands of products.

In one particular implementation, fixed and variable portions of a customizable Internet document are identified. The variable portion is isolated, for example, by extracting string literals from the document. Customized versions of the variable portion are stored, e.g., in a directory hierarchy sorted by country and language. When the client issues a request, a customized document is generated by combining the fixed portion and a selected customized version and is transmitted to the client.

Another implementation is a method for delivering a customized electronic mail message to a client. Indicators of the message type and language are received from the client, along with custom data used to generate the electronic mail message. Based on the message type and language, a selected message template is received and is combined with the custom data to generate message components, such as the sender's and recipient's electronic mail addresses, the subject header, and the message body of the electronic mail message. These components are encoded together as the customized electronic mail message, which is transmitted to the client.

According to still another implementation, customized versions of a customizable document are generated by extracting a customizable portion of the localizable document, for example, by extracting string literals from the customizable document. Customized versions of the customizable portion are stored in a directory hierarchy. Each of these customized versions is translated to multiple encoded versions representing, e.g., Unicode, UTF-8, and DBCS versions of the same content. These encoded versions are stored in the directory hierarchy.

Yet another implementation is directed to a method for delivering a customized document to a client. A fixed portion and multiple localized versions of a variable portion of a customizable document are stored. A client request including a DNS entry is received from the client. This DNS entry is detected and is used as a basis for selecting one of the customized versions to use in constructing the localized document. The customized document is generated by combining the fixed portion with the selected customized version and is delivered to the client.

Still other implementations include computer-readable media and apparatuses for performing these methods. The above summary of the present invention is not intended to describe every implementation of the present invention. The figures and the detailed description that follow more particularly exemplify these implementations.

DETAILED DESCRIPTION OF THE INVENTION

In the following detailed description of the preferred embodiments, reference is made to the accompanying drawings that form a part hereof, and in which are shown by way of illustration specific embodiments in which the invention may be practiced. It is understood that other embodiments may be utilized and structural changes may be made without departing from the scope of the present invention.

Hardware and Operating Environment

Figure 1:
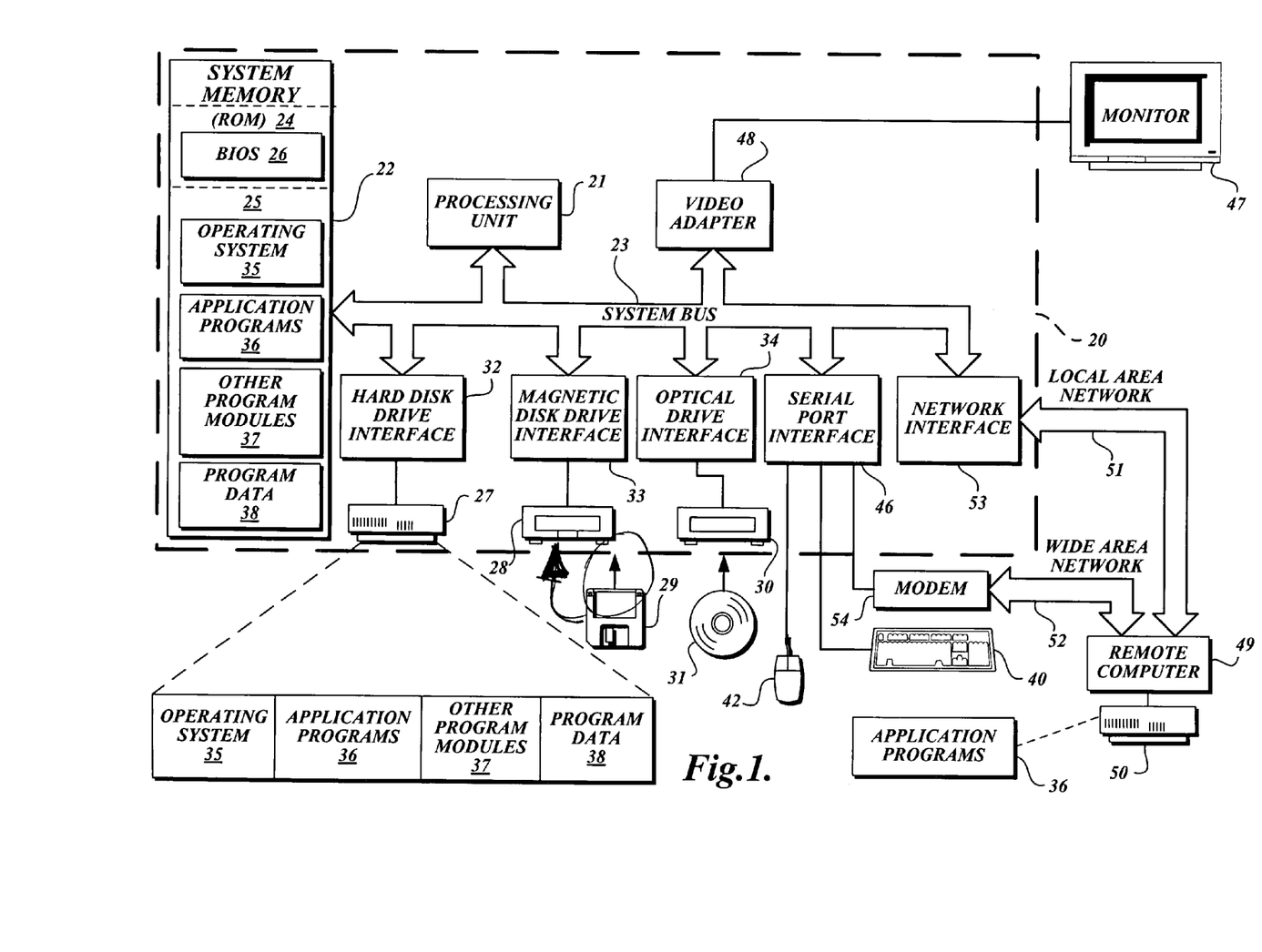
FIG. 1 illustrates a simplified overview of an example embodiment of a computing environment for the present invention.

FIG. 1 illustrates a hardware and operating environment in conjunction with which embodiments of the invention may be practiced. The description of FIG. 1 is intended to provide a brief, general description of suitable computer hardware and a suitable computing environment with which the invention may be implemented. Although not required, the invention is described in the general context of computer-executable instructions, such as program modules, being executed by a computer, such as a personal computer (PC). This is one embodiment of many different computer configurations, some including specialized hardware circuits to analyze performance, that may be used to implement the present invention. Generally, program modules include routines, programs, objects, components, data structures, etc. that perform particular tasks or implement particular abstract data types.

Moreover, those skilled in the art will appreciate that the invention may be practiced with other computer-system configurations, including hand-held devices, multiprocessor systems, microprocessor-based or programmable consumer electronics, network personal computers ("PCs"), minicomputers, mainframe computers, and the like. The invention may also be practiced in distributed computing environments where tasks are performed by remote processing devices linked through a communications network. In a distributed computing environment, program modules may be located in both local and remote memory storage devices.

FIG. 1 shows a computer arrangement implemented as a general-purpose computing or information-handling system 80. This embodiment includes a general purpose computing device such as personal computer (PC) 20, that includes processing unit 21, a system memory 22, and a system bus 23 that operatively couples the system memory 22 and other system components to processing unit 21. There may be only one or there may be more than one processing unit 21, such that the processor computer 20 comprises a single central-processing unit (CPU), or a plurality of processing units, commonly referred to as a parallel processing environment. The computer 20 may be a conventional computer, a distributed computer, or any other type of computer; the invention is not so limited.

In other embodiments other configurations are used in PC 20. System bus 23 may be any of several types, including a memory bus or memory controller, a peripheral bus, and a local bus, and may use any of a variety of bus architectures. The system memory 22 may also be referred to as simply the memory, and it includes read-only memory (ROM) 24 and random-access memory (RAM) 25. A basic input/output system (BIOS) 26, stored in ROM 24, contains the basic routines that transfer information between components of personal computer 20. BIOS 26 also contains start-up routines for the system.

Personal computer 20 further includes hard disk drive 27 having one or more magnetic hard disks (not shown) onto which data is stored and retrieved for reading from and writing to hard-disk-drive interface 32, magnetic disk drive 28 for reading from and writing to a removable magnetic disk 29, and optical disk drive 30 for reading from and/or writing to a removable optical disk 31 such as a CD-ROM, DVD or other optical medium. Hard disk drive 27, magnetic disk drive 28, and optical disk drive 30 are connected to system bus 23 by a hard-disk drive interface 32, a magnetic-disk drive interface 33, and an optical-drive interface 34, respectively. The drives 27, 28, and 30 and their associated computer-readable media 29, 31 provide nonvolatile storage of computer-readable instructions, data structures, program modules and other data for personal computer 20. Although the exemplary environment described herein employs a hard disk, a removable magnetic disk 29 and a removable optical disk 31, those skilled in the art will appreciate that other types of computer-readable media which can store data accessible by a computer may also be used in the exemplary operating environment. Such media may include magnetic tape cassettes, flash-memory cards, digital video disks (DVD), Bernoulli cartridges, RAMs, ROMs, and the like.

In various embodiments, program modules are stored on the hard disk drive 27, magnetic disk 29, optical disk 31, ROM 24 and/or RAM 25 and may be moved among these devices, e.g., from hard disk drive 27 to RAM 25. Program modules include operating system 35, one or more application programs 36, other program modules 37, and/or program data 38. A user may enter commands and information into personal computer 20 through input devices such as a keyboard 40 and a pointing device 42. Other input devices (not shown) for various embodiments include one or more devices selected from a microphone, joystick, game pad, satellite dish, scanner, or the like. These and other input devices are often connected to the processing unit 21 through a serial-port interface 46 coupled to system bus 23, but in other embodiments they are connected through other interfaces not shown in FIG. 1, such as a parallel port, a game port, or a universal serial bus (USB) interface. A monitor 47 or other display device also connects to system bus 23 via an interface such as a video adapter 48. In some embodiments, one or more speakers 57 or other audio output transducers are driven by sound adapter 56 connected to system bus 23. In some embodiments, in addition to the monitor 47, system 80 includes other peripheral output devices (not shown) such as a printer or the like.

In some embodiments, personal computer 20 operates in a networked environment using logical connections to one or more remote computers such as remote computer 49. Remote computer 49 may be another personal computer, a server, a router, a network PC, a peer device, or other common network node. Remote computer 49 typically includes many or all of the components described above in connection with personal computer 20; however, only a storage device 50 is illustrated in FIG. 1. The logical connections depicted in FIG. 1 include local-area network (LAN) 51 and a wide-area network (WAN) 52, both of which are shown connecting PC 20 to remote computer 49; typical embodiments would only include one or the other. Such networking environments are commonplace in offices, enterprise-wide computer networks, Intranets and the Internet.

When placed in a LAN networking environment, PC 20 connects to local network 51 through a network interface or adapter 53. When used in a WAN networking, environment such as the Internet, PC 20 typically includes modem 54 or other means for establishing communications over network 52. Modem 54 may be internal or external to PC 20 and connects to system bus 23 via serial-port interface 46 in the embodiment shown. In a networked environment, program modules depicted as residing within PC 20 or portions thereof may be stored in remote-storage device 50. Of course, the network connections shown are illustrative, and other means of establishing a communications link between the computers may be substituted.

Software may be designed using many different methods, including object-oriented programming methods. C++ and Java are two examples of common object-oriented computer programming languages that provide functionality associated with object-oriented programming. Object-oriented programming methods provide a means to encapsulate data members (variables) and member functions (methods) that operate on that data into a single entity called a class. Object-oriented programming methods also provide a means to create new classes based on existing classes.

An object is an instance of a class. The data members of an object are attributes that are stored inside the computer memory, and the methods are executable computer code that act upon this data, along with potentially providing other services. The notion of an object is exploited in the present invention in that certain aspects of the invention are implemented as objects in some embodiments.

An interface is a group of related functions that are organized into a named unit. Some identifier may uniquely identify each interface. Interfaces have no instantiation; that is, an interface is a definition only without the executable code needed to implement the methods that are specified by the interface. An object may support an interface by providing executable code for the methods specified by the interface. The executable code supplied by the object must comply with the definitions specified by the interface. The object may also provide additional methods. Those skilled in the art will recognize that interfaces are not limited to use in or by an object-oriented programming environment.

EXAMPLE EMBODIMENTS OF THE INVENTION

According to one example embodiment of the present invention, customized content is delivered to a user over a computer network, for example, via either Hypertext Transfer Protocol (HTTP) or electronic mail. For discussion purposes only, it is assumed that the content is to be localized, that is, customized for users of diverse language and/or geographical backgrounds. Localizable content—content that lends itself to customization for a particular user based on the language and/or location of the user—is separated from the underlying code used to format the document. This code defines a basic document framework into which localized content is inserted. By separating the content and code, a uniform document format is realized that facilitates creation of localized content by third parties, which are freed from concerns over compatibility issues as they no longer need to create code. Further, expandability to other browsers, languages and geographical regions is enhanced. While the present discussion is particularly focused on localization, it is to be understood that these techniques can also be used to create and deliver content that is customized in other ways, such as customization for promotion of specific products.

In one particular implementation, a rich text HTML-formatted electronic mail message is automatically generated with customizable and localizable content using a template file. The template file represents the layout of the electronic mail message to be generated, which includes a fixed portion and a customizable portion. The fixed portion contains, for example, text that does not vary between individual messages. By contrast, the customizable portion contains information that is specific to each individual message. For example, the customizable portion might be generated based on information from an external database. The fixed and customizable portions are combined to form the electronic mail message, which is delivered to the user.

A message queue receives electronic mail generation jobs from one or more client servers and sends the jobs to a notification server. The notification server, in turn, processes the electronic mail generation jobs into their final multipart Multipurpose Internet Mail Extensions (MIME) encoded format, which can be sent using conventional outbound SMTP servers. The notification server manages the load distribution and failover across the outbound SMTP servers to make efficient use of computing resources. The SMTP servers encode electronic mail messages into a conventional multipart MIME format that supports the inclusion of plain text and HTML versions of the content in a single electronic mail message. Thus, rich text features are available to users of electronic mail software that supports rich text, while users whose software does not support rich text can view the plain text version of the message. Further, non-English and extended characters can be encoded in the message in a format that can be sent using the SMTP protocol.

In a Web environment implementation, localized content is generated and is delivered to a client using HTTP. A localization tool is used to isolate localizable content from the code. The localizable content can be isolated in any of a number of ways, such as by extracting string literals from the code and storing them. The localized content and code are stored in a directory using a hierarchical structure that organizes the code by language and geographical location. With the content and the code separated, third party developers can localize or otherwise modify the content without affecting the code. This technique also provides for expandability, as adding new localized content is simply a matter of creating a new directory in the hierarchy and populating the new directory with localized content. A single Web server hosts multiple sites, each with localized content. Each site has a unique domain name server (DNS) entry mapped to an IP address. When a client request is made against one of the DNS entries, the request is directed to the corresponding IP address. The original DNS entry, however, is preserved in the request. The server code uses the DNS entry to determine which site's content to use in the response. The server then delivers the appropriate localized content to the client.

Figure 2:
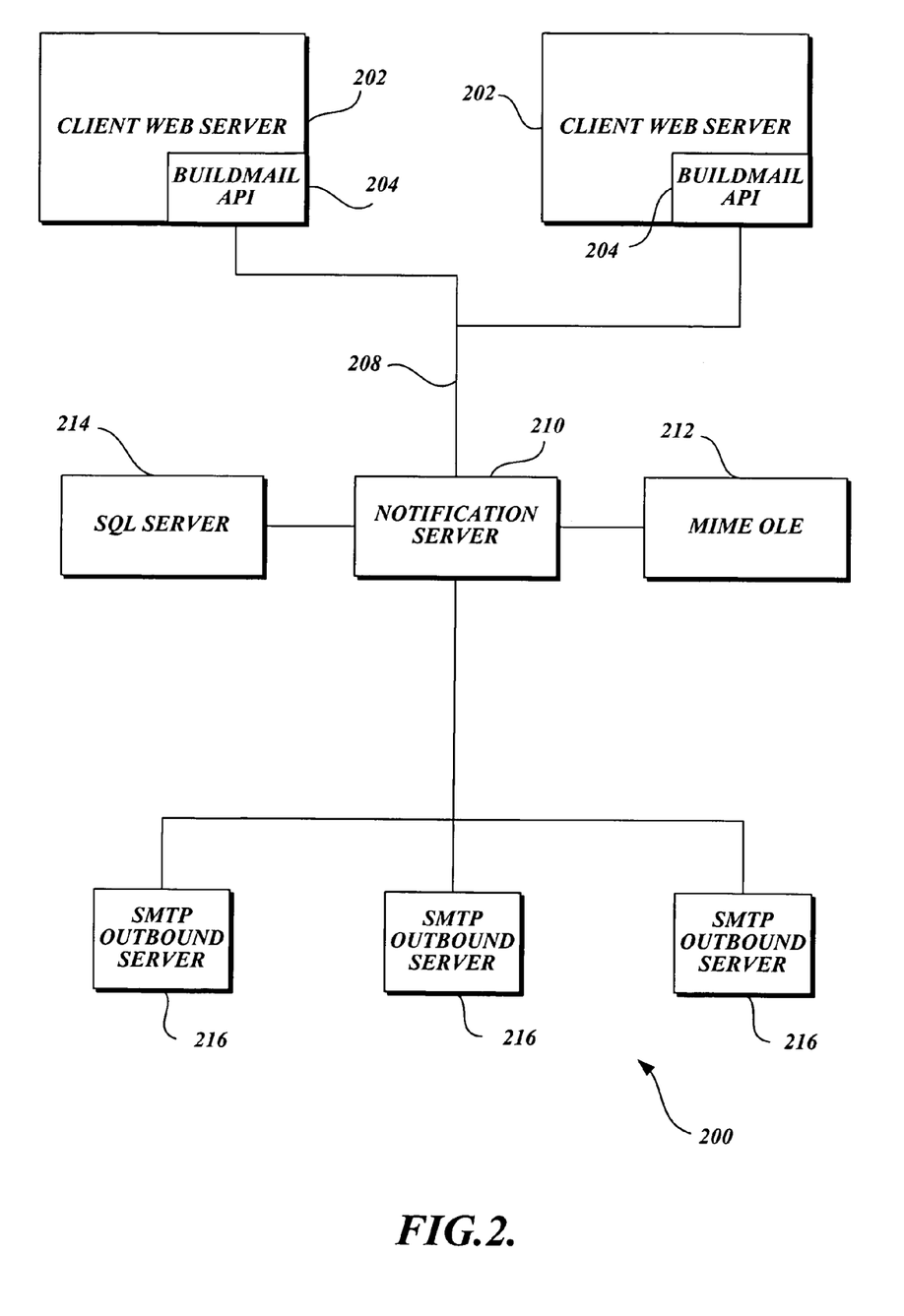
FIG. 2 illustrates an example system architecture for delivering localized and customized electronic mail to clients, according to an example embodiment of the present invention.
Figure 3:
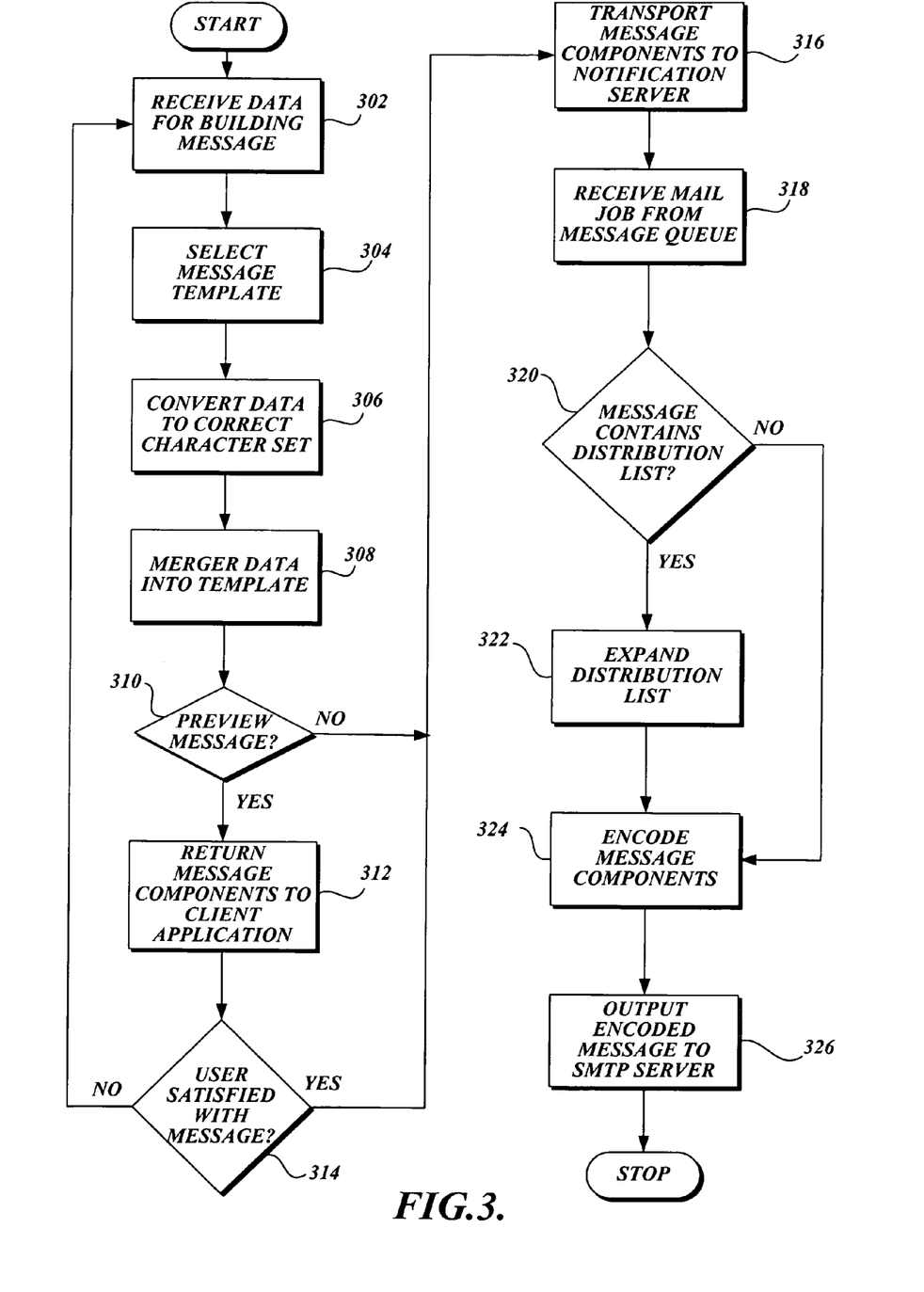
FIG. 3 is a flowchart depicting an example method for delivering localized and customized electronic mail, according to still another embodiment of the present invention.

Referring again to the drawings, FIG. 2 depicts an example system architecture 200 for delivering localized and customized electronic mail to clients. FIG. 3 is a flow chart depicting an example process 300 followed by the system architecture illustrated in FIG. 2. A client web server 202 initiates the mail creation process at the request of the user. The client web server 202 uses a mail creation Application Program Interface (API) 204, an object that receives the data required to build the electronic mail, as illustrated at block 302 of FIG. 3. For example, the mail creation API 204 receives such data as the type of mail to be created, the content of the mail, the recipient's electronic mail address, and custom data in the UTF-8 format. The mail creation API 204 also receives the desired language and codepage with which the message is to be created. In addition, at block 304, the mail creation API 204 selects and receives one or more message templates stored in the client web server 202 based on, for example, the type and language of the message. These message templates are stored in the client web server 202 according to a directory hierarchy, categorized by codepage and language. For example, one subdirectory in the hierarchy might store French language message templates for use with codepage 1252. In a particular implementation, the message templates are further categorized by country, e.g., American English as distinct from British English. At block 306, the UTF-8 formatted custom data is converted to the correct double byte character set (DBCS) using the specified codepage to facilitate sending the message using a single codepage.

After receiving a message template and the data for creating the message, the mail creation API 204 merges the data with the message template, as depicted at block 308. As a result, message components, such as the sender's and recipient's electronic mail addresses, the subject header, and the message body, are generated. Next, at block 310, the mail creation API 204 determines whether the user wishes to preview the electronic mail message. If so, as illustrated at block 312, the message components are returned to the client application so the user can see how the message will appear to the recipient. If the user is not satisfied with the message, as depicted at block 314, flow returns to block 302, at which the user edits the message and the system receives additional data for building the message. If the user does not wish to preview the message, the message components are instead packaged into a format for output to a message queue 208. The message components are then transported to a notification server 210 via the message queue 208, as illustrated at block 316.

Next, at block 318, the notification server 210 receives the merged information from the message queue 208. At block 320, the notification server 210 determines whether the message is addressed to a distribution list. If so, the notification server 210 references an SQL server 214 to obtain an expansion list specifying the individual addresses constituting the distribution list, as depicted at block 322. The notification server 210 then creates a distinct outbound MIME encoded message for each address in the distribution list. Alternatively, the notification server 210 can include a distribution list of multiple addresses in a single message, e.g., by using a Bcc: header with an address list.

At block 324, the notification server 210 then encodes the message components as a multipart MIME encoded message using, for example, a MIME OLE library 212, to encode extended characters and DBCS characters according to Internet mail conventions. The multipart MIME format supports the inclusion of both plain text and HTML versions of the mail in a single outbound message. Further, the format supports encoding non-English and extended characters into a format that can be transmitted using the SMTP mail protocol.

As depicted at block 326, the notification server 210 then outputs the MIME encoded message or messages to one of several STMP outbound servers 216, which delivers the message to its intended recipient or recipients. To facilitate efficient use of the SMTP outbound servers 216, the notification server 210 uses a round-robin technique to alternate among the SMTP outbound servers 216 and thus manage the load distribution among them. This round-robin technique also helps the notification server 210 manage failover by ensuring that messages are sent only to healthy SMTP outbound servers 216.

It should be noted that FIG. 2 depicts two client web servers 202 associated with the notification server 210, each using a distinct mail creation API 204. The notification server 210 can, however, serve more or fewer client web servers 202. Indeed, a typical network configuration would have far more than two client web servers 202 associated with the notification server 210, and could also have multiple notification servers 210. In this respect, FIG. 2 is simplified.

By selecting a message template based on the recipient's location and/or language, the system can generate localized or customized electronic mail easily. Further, MIME encoding enables the system to send both rich text and plain text versions of content in a single electronic mail message. Accordingly, the receiving mail client can display the best or richest version of the message supported by the mail client.

Figure 4:
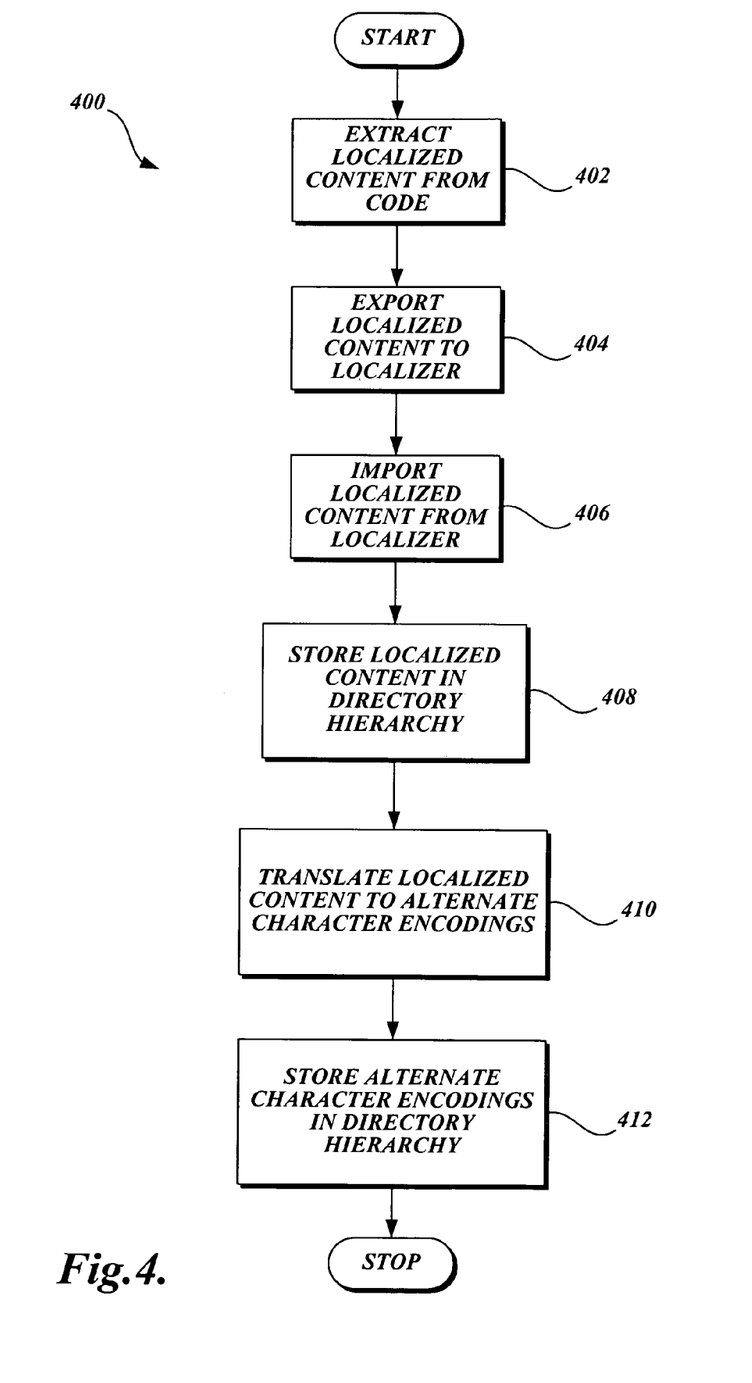
FIG. 4 is a flowchart illustrating an example method for creating and storing localized content of a web site, according to still another embodiment of the present invention.

In another particular embodiment, a single server hosts a Web environment or community that can deliver localized content, e.g., HTML pages, to users from diverse locations using a variety of languages. FIG. 4 depicts an example process 400 for generating localized content for delivery to a diverse user base. First, at block 402, localizable content is isolated from the underlying code by extracting the string literals from the code and storing the string literals as symbols whose names follow a prescribed convention. Next, at block 404, the localizable content is exported to a localizer or localizers for translation to localized content in one or more alternate languages. The localized content is received from the localizer or localizers at block 406, and is stored in a directory hierarchy at block 408.

Figure 5:
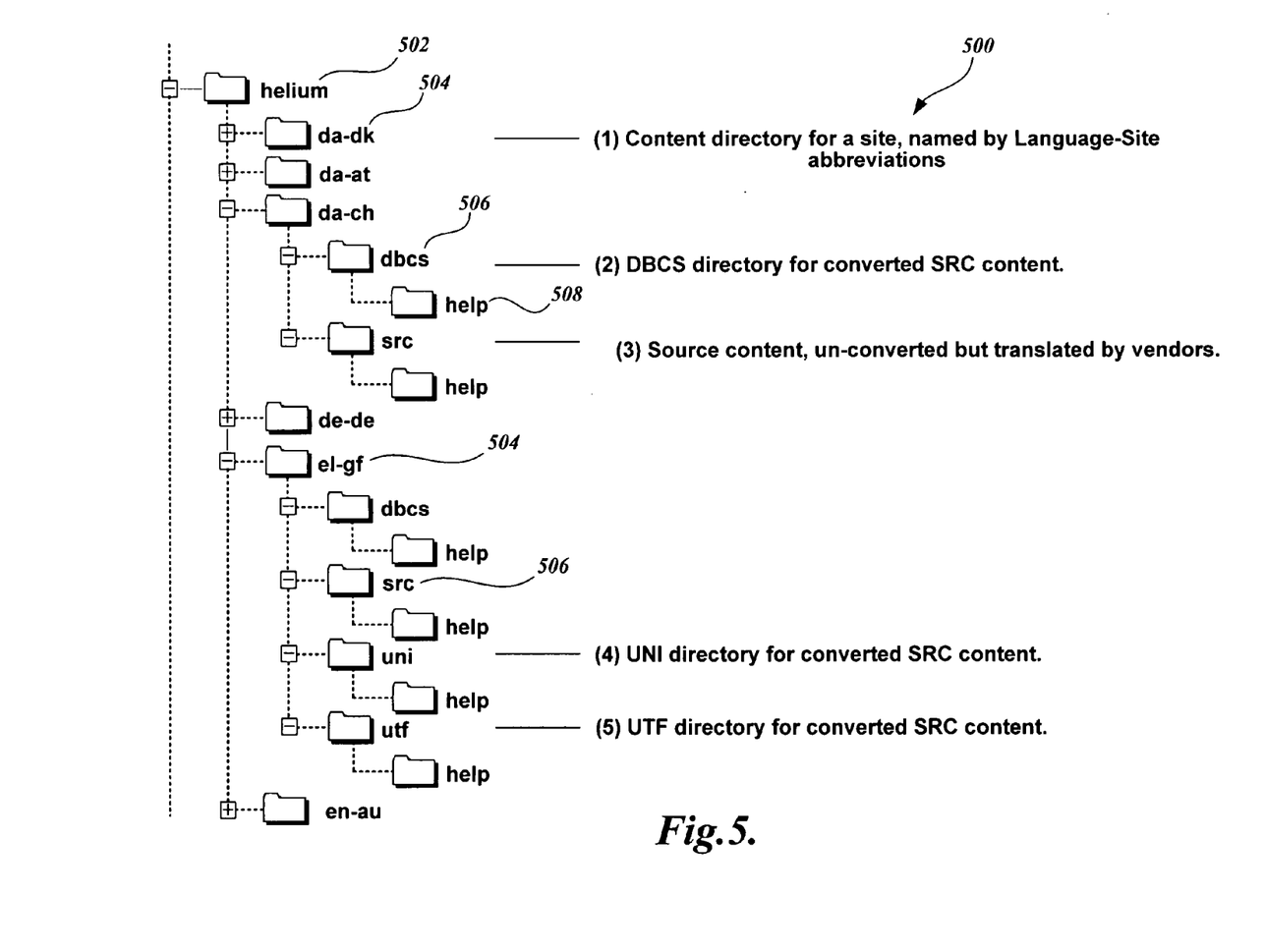
FIG. 5 depicts an example directory hierarchy for use with the methods illustrated in FIGS. 4 and 6.

FIG. 5 depicts an example directory hierarchy 500 that can be used to store the localized content. In this hierarchy, a directory 502 serves as a base directory under which all other directories in the hierarchy are subordinate. Directly under the directory 502 are one or more site directories 504, each of which stores the content for a particular site hosted by the web server. Each site directory 504 has a name that follows a convention based on the country and language corresponding site. Under the site directories 504 are format directories 506, which store the various versions of content within a single country/language group. For example, format directories 506 can be created to store DBCS, Unicode, and UTF-8 versions of the same content, as well as the unconverted localized content itself. Within each format directory 506, one or more document directories 508 may be present; these store different documents, such as help documents.

Referring again to FIG. 4, after the localized content is stored in the directory hierarchy, the system automatically converts the content to one or more versions, e.g., DBCS, Unicode, and UTF-8 versions, as depicted at block 410. In a particular implementation, each localizer is given the DBCS English version of the content. Each localizer then returns a DBCS version of the content, localized for a specific site corresponding to a country-language combination. The system then automatically converts the DBCS version of each translation into UTF-8 and Unicode versions. Thus, localizers only need to translate the content once and to a single character encoding scheme. Finally, at block 412, these versions are stored in the appropriate format directories 506.

Figure 6:
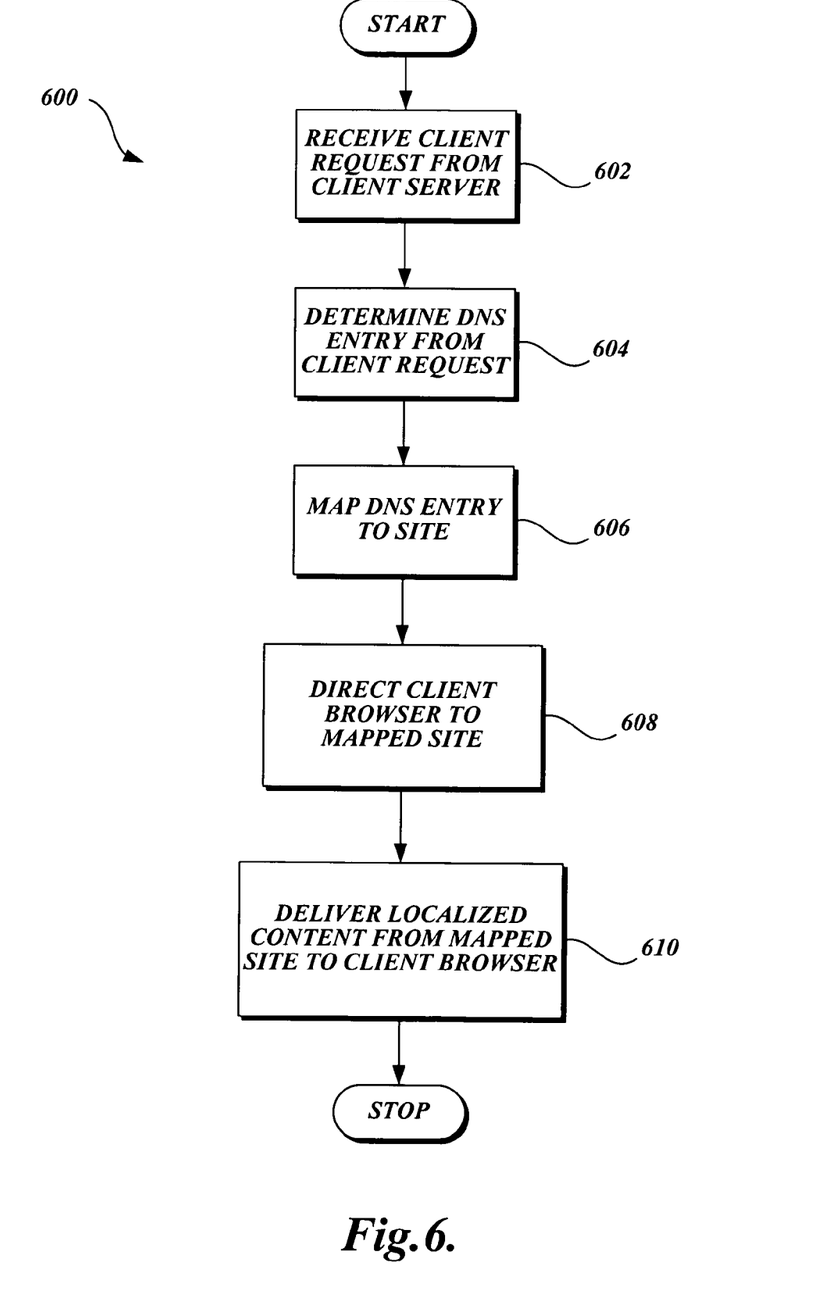
FIG. 6 is a flowchart illustrating an example method for delivering localized content to clients, according to yet another embodiment of the present invention.

Once the localized content has been stored in the directory hierarchy 500, it can be delivered to clients from diverse locations around the world. FIG. 6 depicts an example process 600 for delivering localized content to clients. At a block 602, the web server receives a client request from a client server. From this client request, the web server detects the domain name server (DNS) entry, as depicted at block 604. In this implementation, DNS entries are associated with a single IP address in a many-to-one relationship. That is, several DNS entries, e.g., communities.msn.com, communities.ja-jp.msn.com, communities.de—de.msn.com, etc., are registered and associated with a single IP address, but not necessarily to a single server. Multiple servers can share a single IP address by using a conventional hardware or software tool known as a virtual IP. Client requests to a DNS entry, such as communities.msn.com, are mapped to the virtual IP and passed to a specific server by the virtual IP in what is known as a round-robin technique of handling requests. With multiple DNS entries associated with a single IP address that may be shared between multiple servers, server configuration is simplified, and reliance on the web server's support of virtual web sites is eliminated. Because several DNS entries are associated with a single IP address, client requests containing any of these DNS entries will be directed to the server associated with the IP address. The DNS entry, however, is preserved in the request and is detected by the web server. The web server detects the DNS entry at the beginning of the client request, and all code executed in processing the request uses the results of this detection.

Next, at block 606, the web server maps the DNS entry to a particular language/country site using a configuration table. For example, the web server maps the DNS entry communitiesja-jp.msn.com to the Japanese language/Japanese content site. The client's browser is directed to this site at block 608, and localized content is delivered from this site to the client's browser at block 610.

With all localized content and code stored in the directory hierarchy 500 according to a prescribed convention, a number of benefits are realized. For example, adding a new site and a new site's localized content to the web server is simply a matter of adding the site's directory to the directory hierarchy 500, adding the content under the site's directory, and sharing the code base. Reorganization is not necessary when content is transferred between the directory hierarchy 500 and a production server. Further, support for various browsers is facilitated, as the task is merely a matter of mapping each browser to an appropriate character encoding (e.g., Unicode, UTF-8, DBCS) and delivering the correct combination of content and code to the browser. Because all sites share the same file hierarchy under their site directory, only the top level site decision of which content/code combination to deliver needs to be made. The web server makes this decision at the time of the client request based on HTTP header information.

While the embodiments of the invention have been described with specific focus on their embodiment in a software implementation, the invention as described above is not limited to software embodiments. For example, the invention may be implemented in whole or in part in hardware, firmware, software, or any combination thereof. The software of the invention may be embodied in various forms such as a computer program encoded in a machine-readable medium, such as a CD-ROM, magnetic medium, ROM or RAM, or in an electronic signal. Further, as used in the claims herein, the term "module" shall mean any hardware or software component, or any combination thereof.

What is claimed is:

1. A computer-implemented method for generating localized versions of a localizable Internet document suitable for delivery to a client, the method comprising:

extracting localizable content from a localizable Internet document that contains both localizable content and non-localizable content, the localizable content being translatable according to different languages and/or geographical locations into multiple localized versions;

exporting the extracted localizable content to a localizer for translation into multiple localized versions;

in response to receiving multiple localized versions from the localizer, storing the multiple localized versions in a directory hierarchy;

converting each of the multiple localized versions into a plurality of encoded versions, wherein the encoded versions represent double-byte character set ("DBCS"), Universal code character set ("Unicode"), and 8-bit Unicode Transformation Format ("UTF-8") versions of the corresponding localized version;

storing the encoded versions in the directory hierarchy; and creating and delivering a localized Internet document to a client by;

detecting a client request for an Internet document;

based on the request, selecting an encoded version from the encoded versions stored in memory;

combining the non-localizable content of the localizable Internet document with the encoded version to form the localized Internet document; and delivering the localized Internet document to the client.

2. The method of claim 1, wherein extracting the localizable content of the localizable Internet document comprises:

extracting string literals from the localizable Internet document; and storing the string literals as symbols.

3. The method of claim 2, wherein the localizable Internet document is an electronic communication.

4. The method of claim 3, wherein the electronic communication is electronic mail.

5. The method of claim 2, wherein the localizable Internet document is a portion of a Web page document.

6. The method of claim 1, wherein the localizable Internet document is an electronic mail document.

7. The method of claim 1, wherein the localizable Internet document is a Web page document.

8. A computer-readable medium having computer-executable instructions for generating localized versions of a localizable Internet document suitable for delivery to a client, comprising:

extracting localizable content from a localizable Internet document that contains both localizable content and non-localizable content, the localizable content being translatable according to different languages and/or geographical locations into multiple localized versions;

exporting the extracted localizable content to a localizer for translation into multiple localized versions;

in response to receiving multiple localized versions from the localizer, storing the multiple localized versions in a directory hierarchy;

converting each of the multiple localized versions into a plurality of encoded versions, wherein the encoded versions represent double-byte character set ("DBCS"), Universal code character set ("Unicode"), and 8-bit Unicode Transformation Format ("UTF-8") versions of the corresponding localized version;

storing the encoded versions in the directory hierarchy; and creating and delivering a localized Internet document to a client by;
- detecting a client request for an Internet document;
- based on the request, selecting an encoded version from the encoded versions stored in memory;
- combining the non-localizable content of the localizable Internet document with the encoded version to form the localized Internet document; and
- delivering the localized Internet document to the client.

9. The computer-readable medium of claim 8, wherein extracting the localizable content of the localizable document comprises:
- extracting string literals from the localizable Internet document; and
- storing the string literals as symbols.

10. The computer-readable medium of claim 9, wherein the localizable Internet document is an electronic communication.

11. The computer-readable medium of claim 10, wherein the electronic communication is electronic mail.

12. The computer-readable medium of claim 9, wherein the localizable Internet document is at least a portion of a Web page document.

13. Previously presented) The computer-readable medium of claim 8, wherein the localizable Internet document is electronic mail.

14. The computer-readable medium of claim 8, wherein the localizable Internet document is a Web page document.

15. A computer arrangement configured to execute computer-executable instructions for generating localized versions of a localizable Internet document suitable for delivery to a client, comprising:
- extracting localizable content from a localizable Internet document that contains both localizable content and non-localizable content, the localizable content being translatable according to different languages and/or geographical locations into multiple localized versions;
- exporting the extracted localizable content to a localizer for translation into multiple localized versions;
- in response to receiving multiple localized versions from the localizer, storing the multiple localized versions in a directory hierarchy;
- converting each of the multiple localized versions into a plurality of encoded versions, wherein the encoded versions represent double-byte character set ("DBCS"), Universal code character set ("Unicode") and 8-bit Unicode Transformation Format ("UTF-8") versions of the corresponding localized version; and
- storing the encoded versions in the directory hierarchy; and
- creating and delivering a localized Internet document to a client by:
  - detecting a client request for an Internet document
  - based on the request selecting an encoded version from the encoded versions stored in memory;
  - combining the non-localizable content of the localizable Internet document with the encoded version to form the localized Internet document; and
  - delivering the localized Internet document to the client.

16. The computer arrangement of claim 15, wherein extracting the localizable content of the localizable Internet document comprises:
- extracting string literals from the localizable document; and
- storing the string literals as symbols.

17. The computer arrangement of claim 16, wherein the localizable Internet document is an electronic mail document.

18. The computer arrangement of claim 16, wherein the localizable Internet document is a Web page document.

19. The computer arrangement of claim 15, wherein the localizable Internet document is an electronic communication.

20. The computer-readable medium of claim 19, wherein the electronic communication is electronic mail.

21. The computer arrangement of claim 15, wherein the localizable Internet document is at least a portion of a Web page document.

* * * * *